(No Model.)
W. McLACHLAN & A. McFARLAND.
MOTOR FOR CHURNS.
No. 252,118. Patented Jan. 10, 1882.
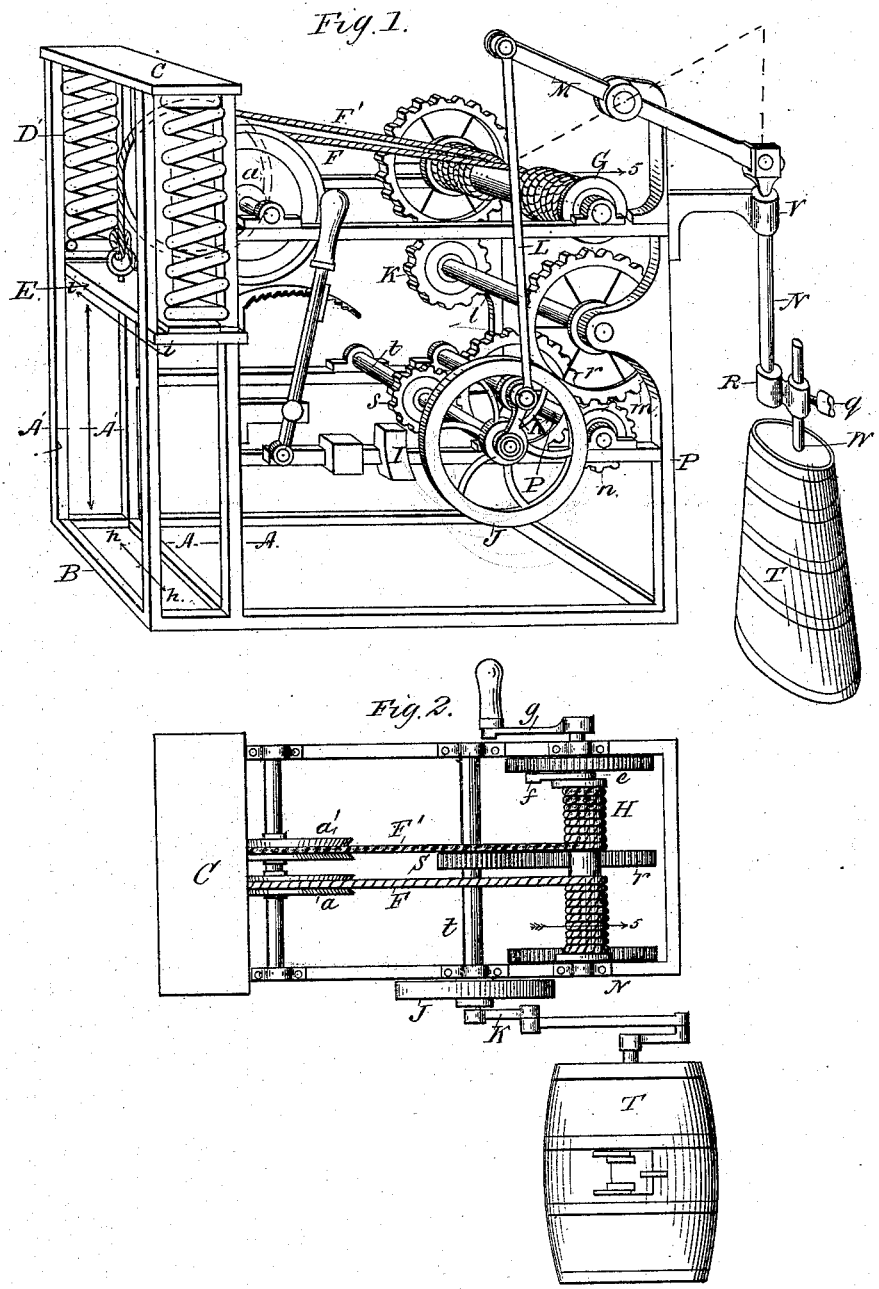

UNITED STATES PATENT OFFICE.

WILLIAM McLACHLAN AND ALLAN McFARLAND, OF WILKINSBURG, PA.

MOTOR FOR CHURNS.

SPECIFICATION forming part of Letters Patent No. 252,118, dated January 10, 1882.

Application filed January 20, 1881. (No model.)

*To all whom it may concern:*

Be it known that we, WILLIAM McLACHLAN and ALLAN McFARLAND, citizens of the United States, residing at Wilkinsburg, in the county of Allegheny and State of Pennsylvania, have invented jointly a new and useful Motor for Churns, of which the following is a specification.

Our invention relates to improvements in motors for churns, in which powerful springs are employed in such a manner that when they are compressed they shall drive or revolve multiplying cog or friction wheels having a crank attachment with either a reciprocating or rotary churn, whereby the churn shall be operated when the motor is wound up; and the objects of our invention are, first, to provide a continuously-moving motion to the churn, so that the agitation of the cream in the churn shall continue without interruption, whereby a larger yield and better quality of butter will be produced from the cream than when the process of churning is conducted irregularly; second, to provide means whereby the force required to operate the churn may be applied to the motor in a few minutes of time by strong men or by horse-power, at such times as shall be most convenient, or during the spare hours of men and of horses, at the dairy or on the farm, to be used off or on the churn by women or other persons when required to do the churning, who shall need merely to attach the churn or churns at the time they have them ready for operation, and who may attend to other duties during the time the motor is operating the churn; third, to avoid the use of dogs in the churning-mill, they being expensive and unreliable, and operate the churn unevenly; and, fourth, to provide a motor that shall be portable without the detachment of any of the parts belonging to it. We attain these objects by the mechanism illustrated in the accompanying drawings, in which—

Figure 1 is a perspective view of the entire machine, to which is attached a vertical-reciprocating churn. Fig. 2 is a top view of the same, showing a horizontal rotary churn attached thereto.

Similar letters refer to similar parts throughout the two views.

The standards A A and A' A', arms B B', and plate C form the frame for the springs D D', which press against a plate, E, the said plate E being constructed and arranged with the standards A A and A' A' in such a manner that the plate E shall move up and down the standards A A and A' A' with freedom, the said standards A A and A' A' guiding the plate E to keep it in the proper position, and also holding the springs D D' in their places. The said plate E has the ropes or flexible cord attachments F F', which bear on the pulleys $a\ a'$ and connect with the cylinder G, around which they are coiled when the machine is wound up.

Upon the shaft of the cylinder G is a ratchet-wheel, $e$, Fig. 2, and a gear-wheel, H, the said gear-wheel H carrying a pawl, $f$, that engages with the ratchet-wheel $e$, whereby when the machine is wound up its reaction revolves gear H. The wheel H communicates motion by a train of gearing, $k\ m\ r\ s$, to the crank-shaft $t$, which, by the crank K, shaft L, and walking-beam M, operates the reciprocating bar N, that is held by the guide $v$, attached to the frame P.

J is a balance or fly wheel to insure a steady motion of the machine, and I is a brake attached to the machine for the purpose of regulating the speed.

The machine is to be wound up by a crank applied to the extension of the shaft of cylinder G, or shaft $l$, P, or $t$, or in any other desired manner.

The springs D D' may be constructed to any length desired to increase or diminish the time the motor shall run on one winding up, or to increase or diminish the number of revolutions, without changing the gearing, by merely extending or changing the length of the arms A A' and ropes F F' and position of pulleys $a\ a'$.

We are aware that there have been motors constructed for the purpose of operating churns by means of springs, and we therefore do not claim such invention, broadly; but What we do claim as our invention, and desire to secure by Letters Patent, is—

In churn-motors, the plate E, in combination with the standards A A and A' A', springs D D', flexible cords F F', cylinder G, wheel H, gearing $k\ m\ r\ s$, shaft $t$, crank K, shaft L, beam M, and bar N, substantially as specified.

WILLIAM McLACHLAN.
ALLAN McFARLAND.

Witnesses:
LUKE B. DAVISON,
WM. S. DEEDS.